Nov. 4, 1930. G. F. DRIEMEYER ET AL 1,780,466
LOCOMOTIVE STRUCTURE
Filed Sept. 14, 1928 5 Sheets-Sheet 2
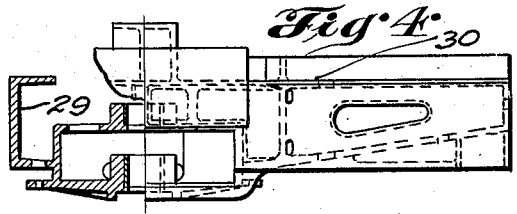
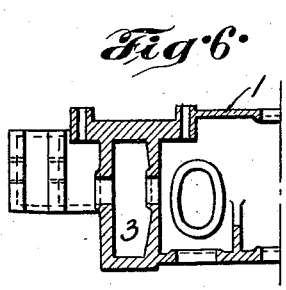
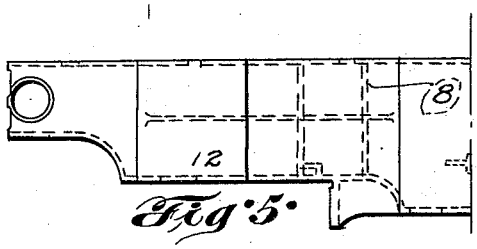
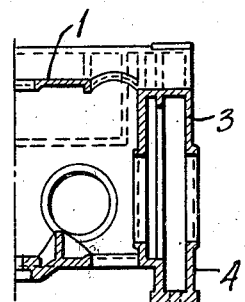
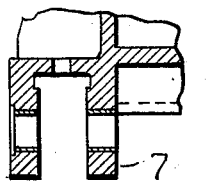
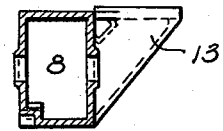
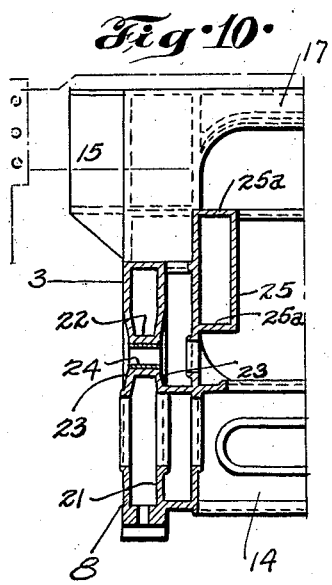
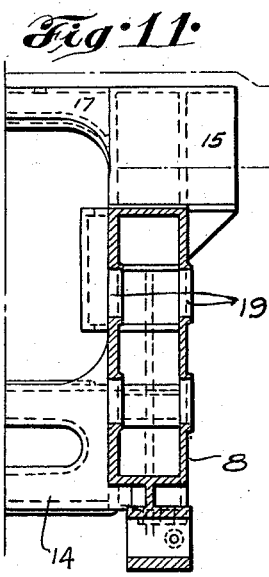
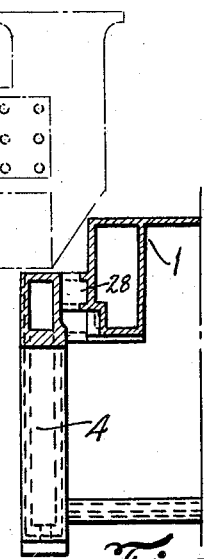
INVENTORS
George Fred Driemeyer
Edwin C Jackson
By Rodney Bedell
ATTORNEY Nov. 4, 1930. G. F. DRIEMEYER ET AL 1,780,466
LOCOMOTIVE STRUCTURE
Filed Sept. 14, 1928 5 Sheets-Sheet 3
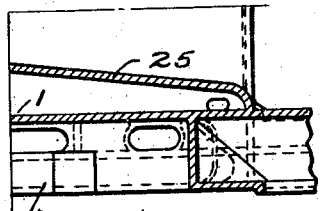
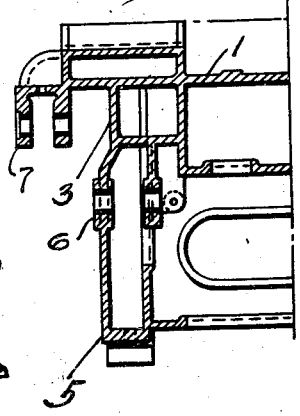
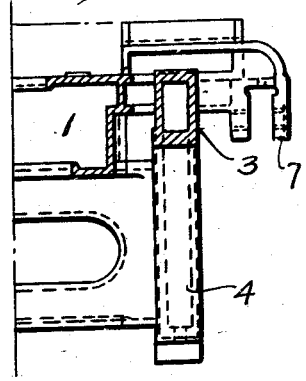
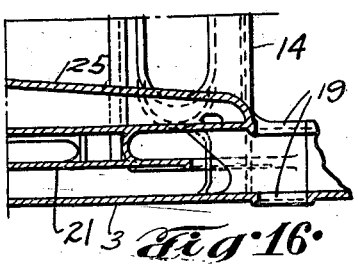
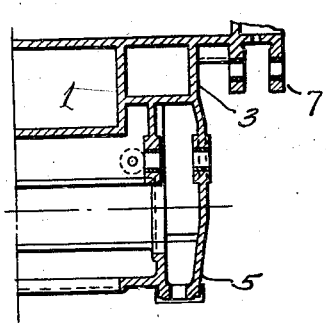
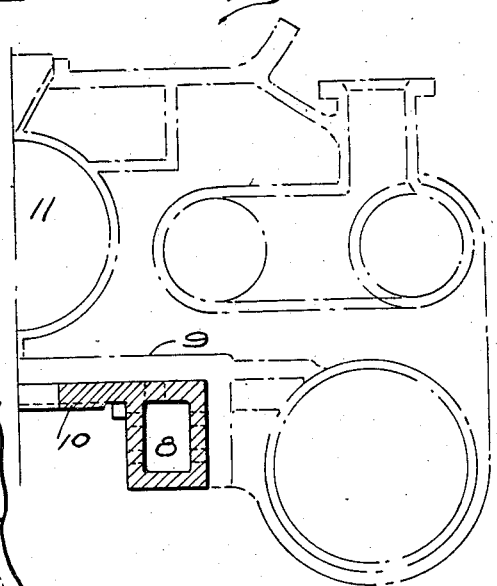
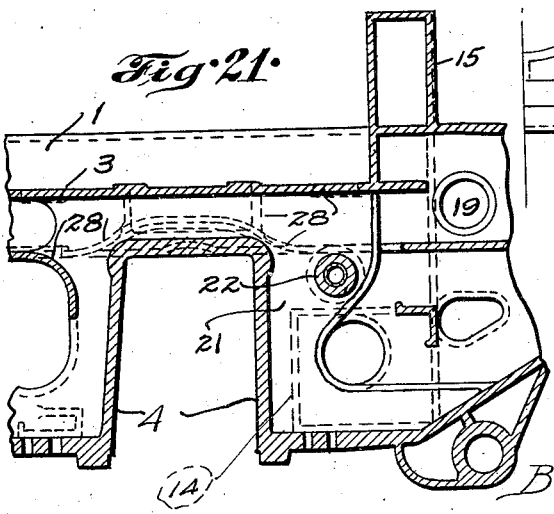
INVENTORS
George Fred Driemeyer
Edwin C. Jackson
By Rodney Bedell
ATTORNEY Nov. 4, 1930. G. F. DRIEMEYER ET AL 1,780,466
LOCOMOTIVE STRUCTURE
Filed Sept. 14, 1928  5 Sheets-Sheet 4
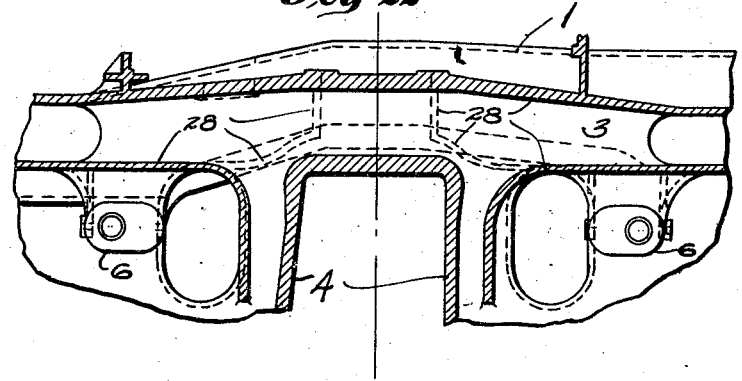
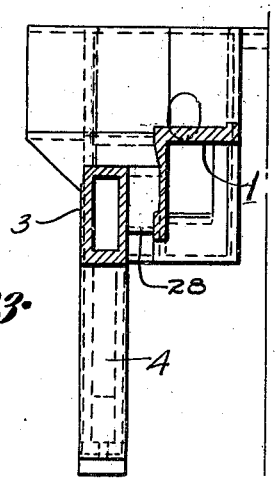
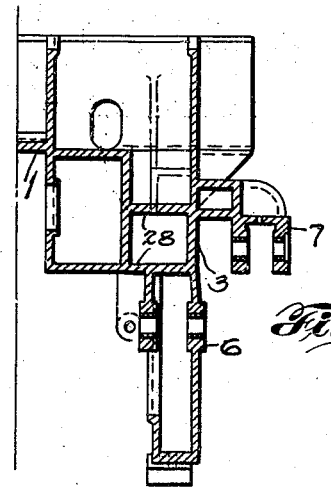
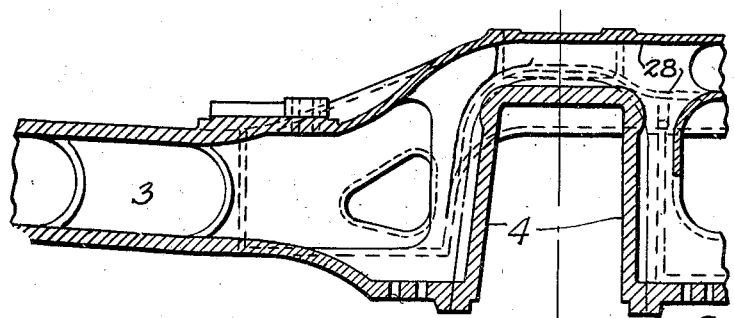
INVENTOR
George Fred Driemeyer
Edwin C. Jackson
By Rodney Bedell
ATTORNEY Nov. 4, 1930.  G. F. DRIEMEYER ET AL  1,780,466
LOCOMOTIVE STRUCTURE
Filed Sept. 14, 1928   5 Sheets-Sheet 5
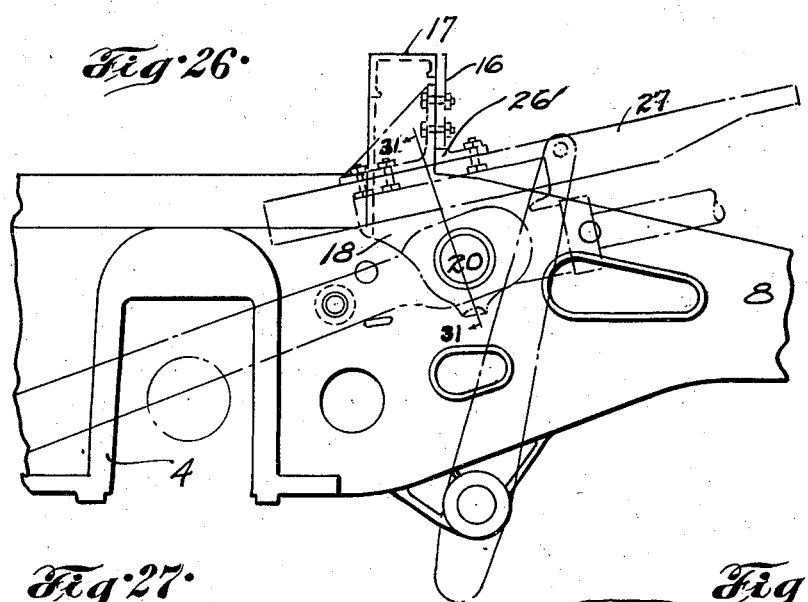
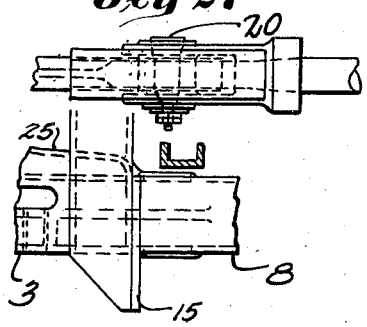
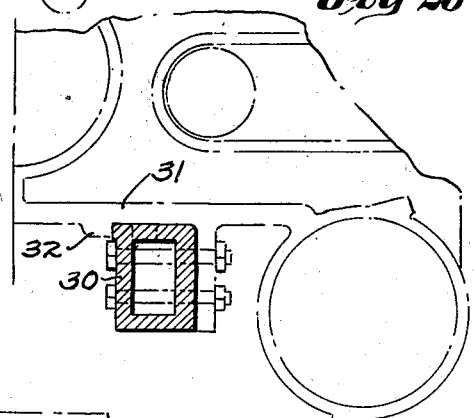
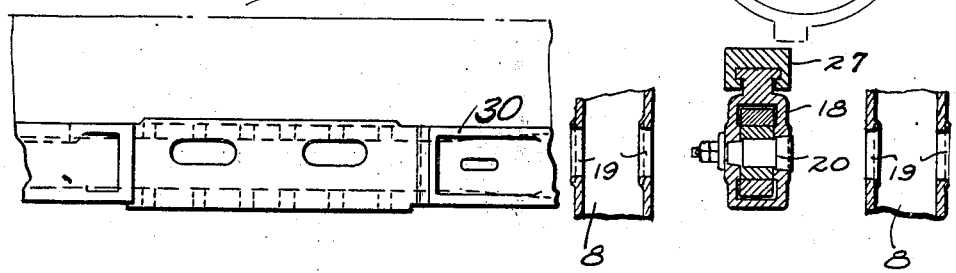
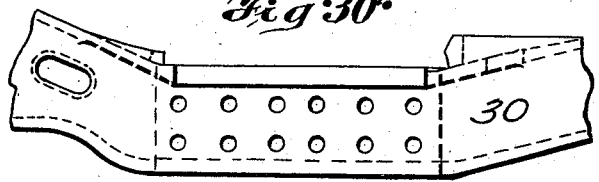
INVENTOR
George Fred Driemeyer
Edwin C. Jackson
By Rodney Bedell
ATTORNEY

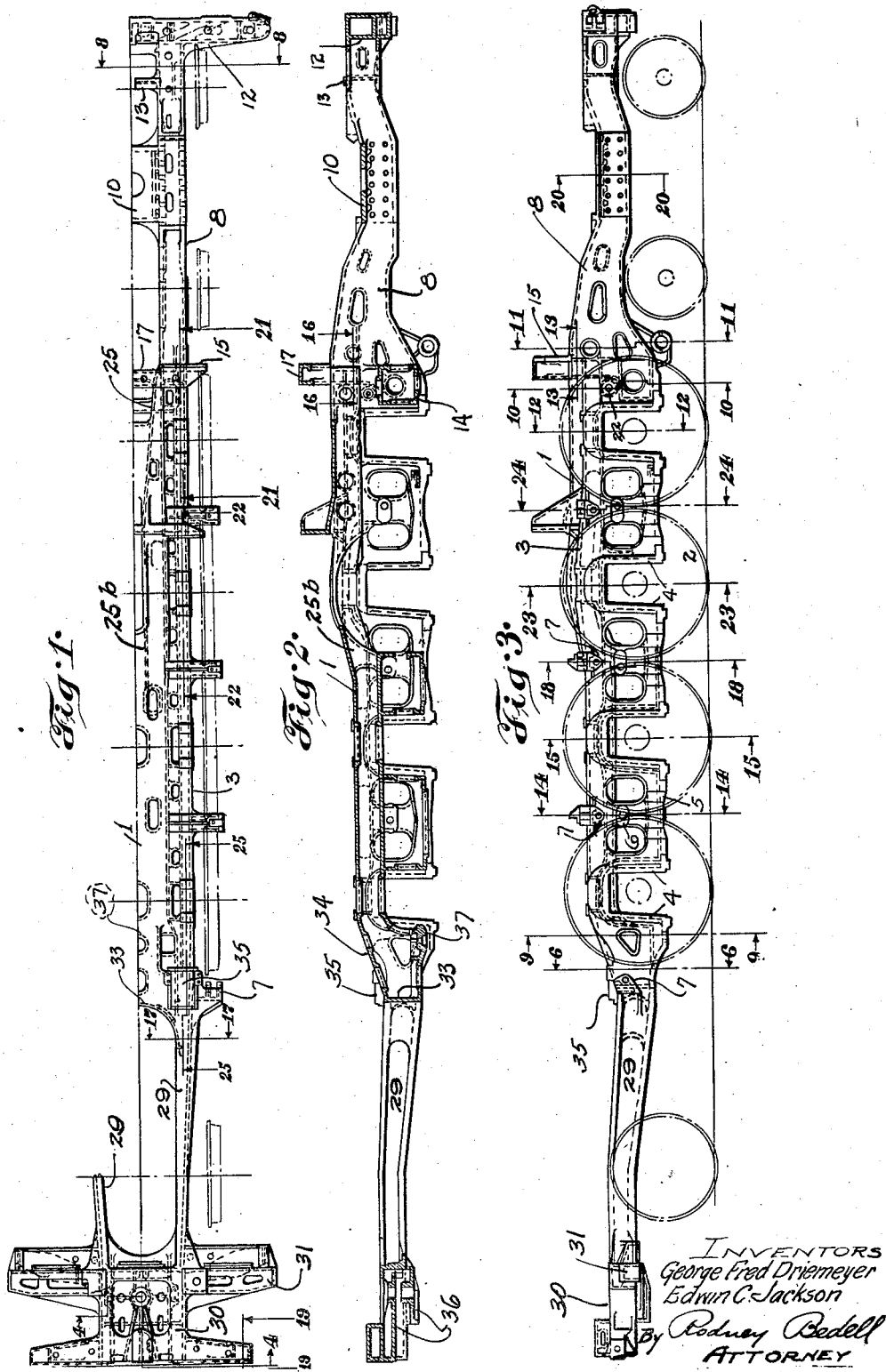

Patented Nov. 4, 1930

1,780,466

UNITED STATES PATENT OFFICE

GEORGE FRED DRIEMEYER AND EDWIN C. JACKSON, OF ST. LOUIS, MISSOURI, ASSIGNORS, BY MESNE ASSIGNMENTS, TO GENERAL STEEL CASTINGS CORPORATION, OF GRANITE CITY, ILLINOIS, A CORPORATION OF DELAWARE

LOCOMOTIVE STRUCTURE

Application filed September 14, 1928. Serial No. 306,008.

Our invention relates to railway rolling stock and consists in novel locomotive structure, and particularly in the underframing or bed structure of the locomotive and in the parts associated therewith.

One of the objects of our invention is to provide a bed which will afford the maximum amount of strength for the weight of material used, and which will maintain its rigidity and the positioning of the parts mounted thereon indefinitely, without the necessity for frequent inspection and tightening of assembled parts.

Another object of our invention is to provide a bed structure having a main centrally located load-supporting and longitudinal-force-transmitting member, extending throughout the space abreast of the drivers, and terminating in spaced arms extending forwardly and rearwardly of the space occupied by the drivers and serving to transmit longitudinal forces to and from the central member, diagonal splices being utilized to connect the central member and the arms. Preferably the central member, arms and connecting splices will be formed integrally with each other and, in the selected embodiment of our invention illustrated, we show these parts as comprising a one piece casting.

Another object of our invention is to provide a bed for a locomotive having one or more steam cylinders located intermediate the sides of the locomotive. Usually such intermediate steam cylinders are formed integral with the outside cylinder casting which is mounted on the frame side members and secured to the outside of the latter and the heat from the intermediate cylinder expands the cylinder casting and tends to stretch the bolts or other securing elements, thereby loosening the same and also setting up undesirable strains in the locomotive bed. With our construction, we provide a horizontal plate or cross tie integral with and between the top edges of the bed side members and engaging the underside of the intermediate cylinder casting and the same serves as a cylinder support and an expansion plate whereby the side members may spread and contract according to the expansion or contraction in the cylinder casting, thus eliminating the strains on bolts or other securing elements on the outside of the side members.

Other more detailed objects of our invention are to provide for more rigid structure of the driver pedestals and the spring hanger brackets, to facilitate application and removal of the spring hangers and for the application and operation of the cross head for the intermediate cylinder or cylinders, and to provide for mounting other equipment on the bed and to accommodate other conditions arising out of the use of the bed, as will be pointed out in the following specification and will be apparent from inspection of the accompanying drawings, in which—

Figure 1 is a one-half longitudinal top view of our bed.

Figure 2 is a vertical longitudinal section on the center line thereof.

Figure 3 is a side elevation of the same.

Figures 4, 8, 17, 19, 21, 22 and 25 are vertical sections taken on the corresponding section lines of Figure 1.

Figure 16 is a horizontal section taken on the line 16—16 of Figure 2.

Figures 6, 9, 10, 11, 12, 14, 15, 18, 20, 23, and 24 are vertical sections taken on the corresponding section lines of Figure 3.

Figure 13 is a horizontal section taken on the line 13—13 of Figure 3.

Figure 5 is an end view of one-half of the front end of the bed showing the pilot beam.

Figure 7 is an enlarged detail section through the brake hanger bracket which is also shown in Figure 14.

Figure 26 is an enlarged detail showing the mounting of the motion plate for the intermediate cylinder and positioning of the cross head and guide rod relative thereto.

Figure 27 is a top view of the same structure.

Figure 28 is a vertical section, and Figures 29 and 30 are, respectively, top and inside side views illustrating a modification of our invention.

Figure 31 is a detail section taken on the line 31—31 of Figure 26.

As stated above, our bed consists preferably of a one piece casting in which the main body portion 1, extending abreast of the drivers, is of box-shaped cross section throughout most of its length, although a portion thereof, adjacent the main driver 2, is of inverted U-shape section in order to accommodate the crank arms, counterbalances and connecting rod for the axle of that driver. Vertical reinforcing webs 25$^b$ are provided for the inverted U-shaped section and connect the bottom member of the box section backbone with the horizontal member of the U-shaped section. Extending alongside of the backbone member 1 are side frames 3 which have downwardly projecting portions 4 forming pedestal legs and integral therewith are suitable members 5 connecting the legs of adjacent pedestals and suitable brackets 6 for the spring equalizers and other brackets 7 for the brake hangers.

In front of the drivers, the main members 8 of the bed are box-shaped in cross section and are substantially wider than the side frames 3. These side members 8 are adapted to mount cylinder casting 9 (Fig. 20) and the portions of the members 8 adjacent to the cylinders are connected by an integral horizontal flange 10 which is so close to the steam cylinder or cylinders 11 located intermediate members 8 that it will be heated to substantially the same degree as the cylinder casting will be heated, and, hence, will expand and will spread the side members 8 with the cylinder casting, thus avoiding the tendency to separate the cylinder casting from its support which would exist if the side members were independent of each other at this point.

The front ends of member 8 are connected by a front end member 12, including a pilot beam. Intermediate of member 12 and expansion plate 10, each of the sides is provided with a bracket 13 for mounting valve gear or other operating structure for the cylinder 11. Each bracket 13 is separate from the bracket on the opposite side member whereby the brackets will not interfere with the spreading and contracting of the side member under the influence of expansion plate 10.

Adjacent to the pedestal for the front driver, the lower portions of the side frames 3 are connected by a box-shaped tie or cross member 14 and the side frames, at this point, are also provided with brackets 15 for supporting the motion plate 16 (Fig. 26) which mounts the brackets (one of which is shown at 26) carrying the cross head guide 27. Brackets 15 are connected by an upper cross tie 17 which cooperates with tie 14 in bracing the bed at this point and serves to maintain brackets 15 in proper relation to each other. The use of the box-shaped lower tie 14 and the inverted U-shaped upper tie 17 makes possible the provision of ample space between these tie members for accommodating the movement of the center cross head 18.

Each of the side members 8 is provided with a suitable opening 19 to permit insertion and removal of the cross head pin 20 (Fig. 31) and to facilitate access thereto of a bar, for driving the pin from its bearings, and nuts for securing the pin. The side members, at this point, are spaced apart far enough to permit the insertion of the nuts from above, if desired.

The adjacent pedestal structure includes a vertical wall 21 (Figs. 10 and 21) which extends away from the pedestal (Fig. 21) so as to support the inner end of the spring hanger bearing 22. This provides a much stronger construction than previous arrangements in which the bearing was formed on a single vertical wall and reenforced with suitable transverse ribs. Walls 3 and 21 are depressed adjacent the spring hanger bearing as indicated at 23 (Fig. 10) and these depressed portions are spot faced to secure proper alignment of the hangers. We show a hard steel bushing 24 pressed into place and adapted to be renewed to take care of wear between the pin and its bearing.

A vertical web 25 merges with the inner wall of side member 8 adjacent to the brackets 15 and extends diagonally inwardly and rearwardly therefrom to a point near the main driver, reenforcing the main backbone member 1. The upper and lower portions of web 25 are connected to the continuous vertical wall which forms the inner portion of side member 8 and the outer portion of backbone member 1, as indicated at 25$^a$ in Figure 10, thereby forming a box-shaped splice for effectively transmitting longitudinal forces between the backbone member and the side members 8.

Throughout the portion of the bed abreast of the drivers, the pedestals are connected to the outer wall of the backbone member by suitable members 28 (Figs. 12, 21, 22, and 23) whereby the greater portion of the driving forces acting on the pedestals are transmitted to the backbone member. The driving forces acting on the pedestals are also transmitted to the bottom member of the backbone through the cross ties connecting the pedestals.

At the rear of the drivers the sides of the backbone member diverge slightly and merge with the side frames 3 and with rearwardly extending channel-shaped members 29 which form the sides of the locomotive cradle. The rear portion of backbone member 1 includes a vertical transverse web 33 curved to extend longitudinally of the bed and forming with member 29 a box-shaped section (see Fig. 17). The top wall of the backbone member is inclined immediately in front of web 33 as indicated at 34. Suitable furnace bearers 35 are provided on the inclined wall 34, each having a horizontal top surface for mounting the superstructure. The lower portion of the rear end of the backbone member includes a spherical bearing 37 to which a trailer truck may be pivotally connected in the usual manner and whereby the longitudinal forces transmitted to and from the truck will be applied to the backbone member independently of the side frames.

The rear end of the cradle structure includes a deck plate 30, side bearing arms 31, and members 36 forming a drawbar pocket.

The above described construction provides for maximum strength with minimum weight, affording a much better distribution of metal than possible if the driving forces were transmitted entirely through side members which would require more difficult and heavier construction of the latter because of the pedestal structure and necessity of providing clearance for the springs.

Obviously all of the features illustrated and described need not be incorporated in a bed utilizing the general principles of our invention, and in Figures 28, 29, and 30 we illustrate a modification in which the expansion plate feature is eliminated and the side members 30 support the cylinder casting 31 in the usual manner, and the latter is provided with a lip 32 to engage the inner face of the side members 30 to force the latter outwardly when the cylinder casting is expanded. It will be understood that the other features of the bed are substantially like the preferred construction. These and other modifications in the details of our bed may be made without departing from the spirit of our invention, and we contemplate the exclusive use of all such variations as come within the scope of our claims.

We claim:

1. In a locomotive bed, side members having portions for carrying a steam cylinder casting, and an expansion plate connecting said portions.

2. In a locomotive bed, side members having portions for carrying a steam cylinder casting, and an expansion plate connecting said portions and formed integrally therewith.

3. In a locomotive bed, side members, and an expansion plate connecting said members and adapted to engage a steam cylinder intermediate said members.

4. In a locomotive bed, box-shaped side members, and an expansion plate connecting said members and adapted to engage a steam cylinder intermediate said members.

5. In a one piece casting, side members, an expansion plate connecting said members, said members being unconnected on either side of said expansion plate for a sufficient distance to permit movement of said frames to and from each other at said expansion plate without creating injurious strains.

6. In a locomotive bed, side members each adapted to mount steam cylinder structure, an expansion plate connecting said members, and operating gear brackets on said side members spaced from said expansion plate and separated from each other.

7. In a locomotive bed, side members each adapted to mount steam cylinder structure, an expansion plate connecting said members, and an operating gear bracket on one of said side members spaced from said expansion plate.

8. In a one piece locomotive bed, side members, a cross member at the front end thereof, a cross member spaced therefrom, and a horizontal plate-like member connecting said side members intermediate said cross members and adapted to engage steam cylinder structure located between said side members.

9. In a locomotive bed, side members, a cross member at the front end thereof, a cross member spaced therefrom, and a horizontal plate-like member connecting said side members intermediate said cross members and adapted to engage steam cylinder structure located between said side members, all of said parts being formed of a one piece casting.

10. In a one piece locomotive bed, side members, a cross member connecting said side members, an expansion plate spaced from said cross member and adapted to engage steam cylinder structure, said side members being adapted to deflect laterally when said expansion member is heated and cooled, and an operating device bracket extending inwardly from one of said side members and independent of the other of said side members.

11. In a locomotive bed, spaced side members, a cross tie connecting the lower portions of said members, motion plate brackets supported by said members, and a cross tie connecting the upper portions of said brackets, the space between said cross ties being adapted to accommodate movements of a connecting rod for a cylinder located between said side members.

12. In a locomotive bed, side members, motion plate brackets on said side members extending above the latter, and a cross tie formed integrally with said brackets.

13. A one piece casting comprising a locomotive bed and including spaced side members, a box shaped cross tie connecting the lower portions of said members, and a cross tie connecting the upper portions of said members, said ties being spaced from each other to accommodate connecting rod and cross head elements between them.

14. A one piece casting comprising a locomotive bed, and including spaced side members, a cross tie connecting the lower portions of said members, and a cross tie connecting the upper portions of said members, said ties being spaced from each other to accommodate connecting rod and cross head elements between them.

15. In a locomotive having steam cylinder structure between its sides, an underframe casting having side members and including a cross tie connecting the lower portions of said members, brackets extending above said members, a cross tie connecting the upper portion of said brackets, a motion plate secured to said brackets, and a bracket for a cylinder cross head guide mounted on said motion plate, said cross head guide bracket extending into the space between said cross ties.

16. In a locomotive bed, hollow side members having vertical walls, said side members spaced apart to accommodate a cross head between them, there being alined lateral openings in the vertical walls of one of said members for insertion and removal of the cross head pin.

17. In a locomotive bed, hollow side members having vertical walls, said side members spaced apart to accommodate a cross head between them, and having lateral openings to provide respectively for insertion and removal therethrough of a cross head pin and of a tool for engaging the cross head pin.

18. In a locomotive, a one piece underframe casting having spaced hollow side members with vertical walls, a cross head adapted to operate between said side members in the space between the levels of the top and bottom of said side members, a cross head pin adapted for application to said cross head and alined openings in at least one of said side members, said opening being adapted for passage of said pin through said opening for application to or removal from said cross head.

19. In a locomotive frame, a pedestal leg including spaced walls, and a hanger bearing extending between and carried by said walls.

20. In a locomotive frame, a pedestal leg including spaced walls, and a hanger bearing extending between and formed integrally with said walls.

21. In a locomotive frame, a pedestal leg comprising spaced walls each having a portion depressed towards the other wall, and a hanger bearing extending between and carried by said depressed portions.

22. In a locomotive bed, a pedestal leg including spaced walls, a hanger bearing extending between and carried by said walls, and a backbone member paralleling said walls and provided with lateral openings adjacent to said bearing.

23. In a locomotive bed, a box shaped backbone member extending throughout the space abreast of the driver wheels, a continuous box shaped member between said backbone member and said driving wheels, and a box shaped side member extending forwardly from each side of said backbone member.

24. In a locomotive bed, a box shaped backbone member extending throughout the space abreast of the driver wheels, a continuous box shaped member between said backbone member and said driving wheels, and a box shaped side member extending forwardly and rearwardly from each side of said backbone member at the respective ends thereof.

25. In a locomotive bed, a backbone member extending throughout the space abreast of the driver wheels, and side members extending forwardly of said member to mount steam cylinder structure, side members extending rearwardly of said member to form a cradle, and side frames alongside of said backbone member to mount the driver axle boxes.

26. In a locomotive bed, a hollow backbone member extending throughout the space abreast of the driver wheels, a side member extending forwardly from the end of said backbone member, and a diagonal splice between said members.

27. In a locomotive bed, a hollow backbone member extending throughout the space abreast of the driver wheels, a side member extending beyond the end of said backbone member, and a splice of box shaped cross section extending between said members.

28. In a locomotive, a central backbone member, a relatively shallow side frame paralleling said member for mounting driver boxes, and integral connections at intervals between said frame and said member.

29. In a locomotive, a central backbone member, a side frame paralleling said member for mounting driver boxes, and integral connections at intervals between said frame and the lower portion of said member.

30. In a locomotive bed, side frames for mounting the drivers, side members extending forwardly and rearwardly of said frames to carry superstructure, a backbone member of relatively deeper section extending abreast of said frames for transmitting longitudinal forces, and diagonal connections between said side members and backbone member.

31. In a locomotive bed, side frames for mounting the driver boxes, side members extending forwardly and rearwardly of said side frames to carry superstructure, a backbone member of relatively deeper section extending abreast of said frames for transmitting longitudinal forces, and diagonal connections between said side members and the ends of said backbone member, and other connections, intermediate the ends of said backbone member, between the same and said side frames.

32. In a bed for a locomotive having cylinder structure between its sides, a central backbone member of box shaped cross section extending abreast of the drivers and having an inverted U-shaped section for a portion of its length to accommodate the connecting rod for said cylinder structure.

33. In a bed for a locomotive having cylinder structure between its sides, a central hollow backbone member extending abreast of the driver pedestals, the rear portion of said member being box shaped, the portion forward of the front end of the box shaped portion being of inverted U-section to accommodate the connecting rod for said cylinder structure, and spaced vertical webs connecting the intermediate portion of the bottom wall of said box section portion and the intermediate portion of the horizontal member of the inverted U-shaped section.

34. In a one piece locomotive underframe casting, spaced side members near the forward end of said underframe, a center load carrying member between the driver pedestals, and splices connecting said side members to said load carrying member.

35. In a one piece locomotive underframe casting, box shaped spaced side members near the forward end of said underframe, a center load carrying member between the driver pedestals, and box shaped splices connecting said side members to said load carrying member.

36. In a one piece locomotive underframe casting, a center member between driving wheels and box shaped at its rear end, said box shaped member having a rear vertical wall curved outwardly and rearwardly on each side of said underframe to form the inner wall of a box section portion of a cradle side member.

37. In a one piece locomotive underframe casting, a center load carrying member between driving wheels, said member having a vertical wall at its rear end, said vertical wall curved outwardly and rearwardly on each side from the longitudinal center line of said underframe to form a portion of a cradle side member.

38. In a one piece locomotive underframe casting, a center load carrying member between driving wheels, a vertical wall at the rear end of said member, a top wall extending forwardly and upwardly from the upper portion of said vertical wall, horizontal furnace bearer members on said top wall, said vertical wall curved outwardly and rearwardly on each side from the longitudinal center line of said underframe to form a portion of a cradle side member.

39. In a one piece locomotive underframe casting, a center load carrying member between driving wheels, a vertical wall at the rear end of said member, a top wall extending forwardly and upwardly from the upper portion of said vertical wall, said vertical wall curved outwardly and rearwardly on each side from the longitudinal center line of said underframe to form a portion of a cradle side member.

40. In a one piece locomotive underframe casting, a box shaped load carrying center member between driving wheels, pedestals, an auxiliary load carrying box shaped side member above said pedestals, a vertical wall at rear end of said center member, spaced cradle side members, the vertical walls of said cradle members merging into the outer walls of said auxiliary side members, said vertical wall at the end of said center member extending outwardly and rearwardly and connected to the top and bottom members of said cradle side members, the outer walls of said center members terminating between the vertical web of said cradle member and said vertical wall at rear end of said center member.

In testimony whereof we hereunto affix our signatures this 10th day of Sept., 1928.

GEORGE FRED DRIEMEYER.
EDWIN C. JACKSON.